United States Patent
Bhattacharya et al.

(10) Patent No.: US 10,110,737 B2
(45) Date of Patent: Oct. 23, 2018

(54) INTELLIGENT OPTIONS IN REDIAL SCREENS OF COMMUNICATION DEVICES

(71) Applicant: QUALCOMM Incorporated, San Diego, CA (US)

(72) Inventors: Sabyasachi Bhattacharya, Hyderabad (IN); Suman Yelati, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 154 days.

(21) Appl. No.: 14/500,577

(22) Filed: Sep. 29, 2014

(65) Prior Publication Data
US 2016/0094709 A1 Mar. 31, 2016

(51) Int. Cl.
| | |
|---|---|
| *H04M 3/46* | (2006.01) |
| *H04M 1/725* | (2006.01) |
| *H04M 3/424* | (2006.01) |
| *H04M 3/42* | (2006.01) |
| *H04L 12/58* | (2006.01) |

(52) U.S. Cl.
CPC ............ *H04M 3/424* (2013.01); *H04L 51/36* (2013.01); *H04M 1/72552* (2013.01); *H04M 1/72566* (2013.01); *H04M 1/72583* (2013.01); *H04L 51/043* (2013.01); *H04M 3/42374* (2013.01); *H04M 3/42382* (2013.01); *H04M 3/46* (2013.01); *H04M 2203/2072* (2013.01); *H04M 2242/28* (2013.01); *H04M 2250/60* (2013.01); *H04M 2250/66* (2013.01)

(58) Field of Classification Search
CPC ..... H04M 3/42374; H04M 2203/2011; H04M 3/42093; H04M 3/42365; H04M 3/5183

USPC ............ 379/210.01, 211.02, 211.03, 211.01, 379/201.01, 207.02, 209.01; 709/202
See application file for complete search history.

(56) References Cited

U.S. PATENT DOCUMENTS

| | | | | |
|---|---|---|---|---|
| 5,905,789 A | * | 5/1999 | Will | ...................... H04M 1/271 379/211.03 |
| 6,963,637 B2 | | 11/2005 | Broussard et al. | |

(Continued)

FOREIGN PATENT DOCUMENTS

WO 2012151658 A1 11/2012

OTHER PUBLICATIONS

International Search Report and Written Opinion—PCT/US2015/048196—ISA/EPO—dated Dec. 2, 2015.

*Primary Examiner* — Thjuan K Addy
(74) *Attorney, Agent, or Firm* — Arent Fox, LLP

(57) ABSTRACT

A user device collects data corresponding to a plurality of communication options used by the user device to communicate with a contact. The data includes for each communication option, a time of last successful communication between the user device and the contact via the communication option. The communication options may include voice-mode communication options such as telephone numbers, and data-mode communication options such as e-mail addresses, instant messaging identifications, and social media identifications. In response to a failed attempt to communicate with the contact, the user device presents the plurality of communication options in a presentation through an interface of the user device. The presentation lists each of the plurality of communication options based on a probability of establishing a successful communication with the contact for each of the plurality of communication options.

30 Claims, 5 Drawing Sheets

(56) References Cited

U.S. PATENT DOCUMENTS

| | | | |
|---|---|---|---|
| 7,801,294 B2 * | 9/2010 | Levy | H04M 3/46 |
| | | | 379/211.03 |
| 8,494,503 B2 | 7/2013 | Winter et al. | |
| 8,744,054 B2 | 6/2014 | Dufrene et al. | |
| 9,065,970 B2 * | 6/2015 | Martinez | H04M 3/42374 |
| 2002/0055967 A1 * | 5/2002 | Coussement | H04L 67/142 |
| | | | 709/202 |
| 2004/0018857 A1 | 1/2004 | Asokan et al. | |
| 2005/0047575 A1 * | 3/2005 | Parker | H04M 3/4931 |
| | | | 379/211.02 |
| 2006/0019640 A1 | 1/2006 | Lai et al. | |
| 2007/0135110 A1 * | 6/2007 | Athale | H04M 1/274516 |
| | | | 455/418 |
| 2008/0311951 A1 | 12/2008 | Camp, Jr. et al. | |
| 2009/0221323 A1 | 9/2009 | Yach | |

* cited by examiner

| Contact | Communication Option | Communication Mode | Timestamp (of last successful communication) 'YYYY-MM-DD HH:MM:SS' |
|---|---|---|---|
| Suman Yelate | Mobile #1 | voice | 2014-07-01 12:37:15 |
| Suman Yelate | Mobile #2 | voice | 2014-05-15 09:18:45 |
| Suman Yelate | Landline #1 | voice | 2014-01-18 15:45:03 |
| Suman Yelate | Landline #2 | voice | 2014-06-03 18:32:17 |
| Suman Yelate | e-mail address #1 | data | 2014-06-30 10:03:55 |
| Suman Yelate | e-mail address #2 | data | 2013-10-07 16:37:10 |
| Suman Yelate | Instant messaging (e.g., Gtalk) | data | 2014-06-25 14:17:34 |
| Suman Yelate | VOIP (e.g., Skype) | data | 2014-05-12 19:05:21 |
| Suman Yelate | Social media #1 (e.g. Facebook) | data | 2014-06-21 11:23:01 |
| Suman Yelate | Social media#2 (e.g., Instagram) | data | 2014-03-15 14:45:40 |

FIG. 2

INTELLIGENT OPTIONS IN REDIAL SCREENS OF COMMUNICATION DEVICES

BACKGROUND

Field

The present disclosure relates generally to communication devices, and more particularly to intelligent options in redial screens of communication devices.

Background

A contacts application in a communication device stores and provides communication options for contacting persons, businesses, organizations, etc. Communication options may include one or more telephone numbers, e.g., home number, mobile number, work number, and one or more e-mail addresses. In a typical communication scenario, a user of a device attempts to establish communication with a contact, e.g., person, business, organization, etc., using one of the telephone numbers associated with the contact. If the call to the contact fails, the contacts application may present to the user an option to redial the same number or to send a message to that number. It would be beneficial to present the user additional communication information, including alternative communication options, that allows the user to make informed decisions on how to most effectively establish communication with the contact.

SUMMARY

In an aspect of the disclosure, a method, a computer program product, and an apparatus are provided. A user device collects data corresponding to a plurality of communication options used by the user device to communicate with a contact. The data includes for each communication option, a time of last successful communication between the user device and the contact via the communication option. The communication options may include voice-mode communication options such as telephone numbers, and data-mode communication options such as e-mail addresses, instant messaging identifications, and social media identifications. In response to a failed attempt to communicate with the contact, the user device presents the plurality of communication options in a presentation through an interface of the user device. The presentation lists each of the plurality of communication options based on a probability of establishing a successful communication with the contact for each of the plurality of communication options

BRIEF DESCRIPTION OF THE DRAWINGS

FIG. 2 is an illustration of contact information maintained by a contacts application.

DETAILED DESCRIPTION

Figure 1:
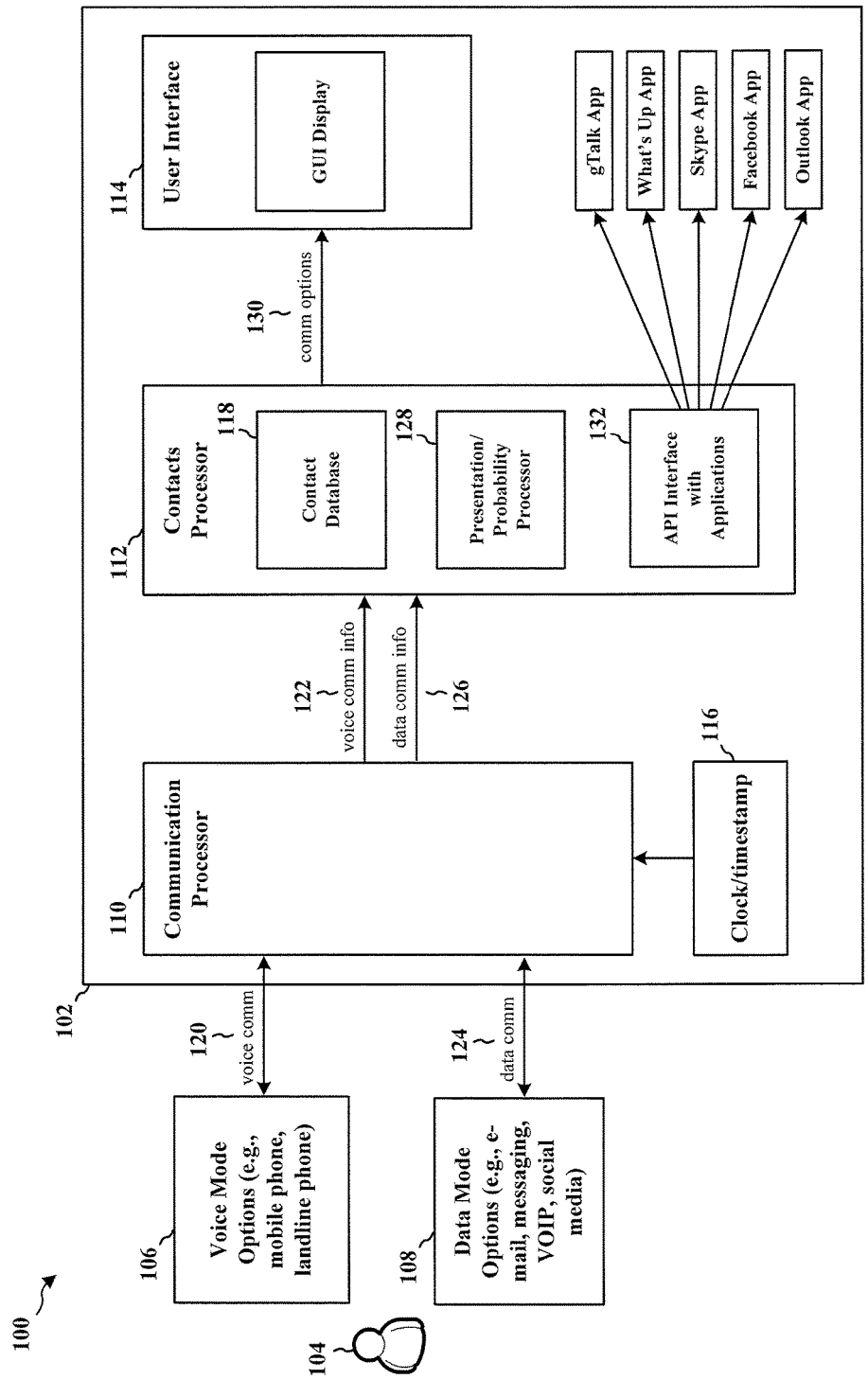
FIG. 1 is a block diagram of a user device including a contacts processor for collecting and presenting communication options for contacts.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of providing a user with alternative communication options to reach a contact when a call to a particular contact was not successful, and to rank the alternative communication options in an intelligent way, e.g., with the most probable on the top, are presented below with reference to various apparatuses and methods. These apparatuses and methods are described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer.

As described above, in a typical communication scenario, a user of a device attempts to establish communication with a contact, e.g., person, business, organization, etc., using one of the telephone numbers associated with the contact. If the call to the contact fails, the contacts application may present to the user an option to redial the same number or to send a message to that number. It would be beneficial to present the user additional communication information, including alternative communication options, that allows the user to make informed decisions on how to most effectively establish communication with the contact.

FIG. 1 is a block diagram 100 of a user device 102, either communicating with or attempting to communicate with a contact 104 through one of a voice mode communication option 106 or a data mode communication option 108. Examples of voice mode communication options include mobile phone numbers and landline phone numbers. Examples of data mode communication options include e-mail, text messaging, voice over internet protocol (VOIP) and social media. The user device 102 includes a communication processor 110, a contacts processor 112, a user interface 114 and a clock/timestamp 116, each of which may be referred to herein as a module. The modules may be software modules running in a processor, resident/stored in a computer readable medium, one or more hardware modules coupled to a processor, or some combination thereof.

The communication processor 110 functions to provide communication between devices associated with the voice mode communication options 106 and the data mode communication options 108. For example, in the case of voice mode communication options 106, the communication processor 110 may be configured to communicate with a mobile device associated with the mobile telephone number, and a landline telephone associated with the landline telephone number. In the case of data mode communication options 108, the communication processor 110 may be configured to communicate with one or more user devices associated with the e-mail, text messaging, VOIP, and social media. These user devices may include one or more of a Smartphone, tablet, laptop, desktop, etc.

The communication processor may include a WWAN (2/3/4G LTE) radio and associated data communication and voice communication processing capabilities that allows the device 102 to switch between voice communication for purposes of communicating by a voice mode option and data communication for purposes of communicating by a data mode option.

The contacts processor 112 includes a contacts database 118 that maintains information for contacts. Information for a particular contact may include name, address, and various communication options for communicating with the contact.

FIG. 2 is an illustration 200 of contact information maintained by a contacts application. The information may be maintained in a database and stored in memory of the device. In the example of FIG. 2, the contact information includes a database record 202 for each communication option 204 associated with a contact 204. A record 202 may maintained for each voice mode communication option, e.g., telephone number for that contact, and for each data mode communication option, e.g e-mail addresses, instant messaging identification, VOIP identifications, and social media identification, for that contact. The records 202 may further include the communication mode 208, e.g., voice or data, of the communication option. As explained further below, the records 202 also include a timestamp 210 of the last successful communication with the contact 204 by the communication option 204.

In addition to maintaining the contacts database, the contacts processor 112 collects data corresponding to attempts by the device 102 to communicate with a contact 104. For example, the contacts processor 112 may track each attempt made by the communication processor 110 to establish communication with a contact. To this end, when the communication processor 110 attempts to establish voice communication 120 with the contact 104, the communication processor 110 may provide voice communication information 122 to the contacts processor 112. The voice communication information 122 may include information corresponding to the voice communication option, such as a telephone number, along with information indicating whether the attempt to establish communication was successful or unsuccessful, and a timestamp corresponding to the time of the communication attempt.

Similarly, when the communication processor 110 attempts to establish data communication 124 with the contact 104, the communication processor 110 may provide data communication information 126 to the contacts processor 112. The data communication information 126 may include information corresponding to the data communication option, such as an e-mail address, along with information indicating whether the attempt to establish communication was successful or unsuccessful, and a timestamp corresponding to the time of the communication attempt.

If the attempt was successful the contacts processor 112 may add the timestamp included in the voice or data communication information 122, 126 to the database record 202 corresponding to the communication option 204, as shown in FIG. 2. If the attempt was unsuccessful, the contacts processor 112 ignores the timestamp and maintains the current timestamp the database record 202 corresponding to the communication option 204. Accordingly, the contacts database 118 includes the time of latest successful communication attempt for the communication options.

The contacts processor 112 is further configured to monitor for failed communication attempts. To this end, the contacts processor 112 receives the voice communication information 122 and data communication information 126 from the communication processor 110. As described previously, the communication information 122, 126 includes information indicating whether a communication attempt was successful or unsuccessful. Based on this information, the contacts processor determines if a communication attempt was unsuccessful, i.e., failed.

Upon determining a failed attempt to communicate, the contacts processor 112 presents alternative communication options 130 for the contact, through the user interface 114 of the device 102. To this end, a presentation/probability processor 128 of the contacts processor 112 analyzes the data included in the data base records for the particular contact and determines an overall order of probability for the communication options included in the entry. The overall order of probability may correspond to an order, wherein the alternative communication options are presented from the alternative communication option having highest likelihood of successful communication with the contact, to the alternative communication option having the least likelihood of successful communication with the contact.

In one configuration, the presentation/probability processor 128 determines the communication mode of the communication option that resulted in the failed attempt to communicate. For example, if the communication option that failed is a telephone number, the presentation/probability processor 128 determines that the communication mode is voice, and if the communication option that failed is an instant message, the presentation/probability processor determines that the communication mode is data. After determining the communication mode, the presentation/probability processor 128 determines an overall order of probability for the communication options. The order may be based on the times of last successful communication between the user device and the contact via the communication options associated with the determined communication mode. In this case, the communication options are limited to those within the same communication mode.

With reference to FIG. 2, in an example of the foregoing, the presentation/probability processor 128 may determine that the communication option resulting in a failed communication attempt was Mobile #1. This determination may be based on voice communication information 122 provided by the communication processor 110. Based on this determination, and a search of the contact database 118 for the record 202 corresponding to the determined communication option Mobile #1, the presentation/probability processor 128 determines the communication mode 208 corresponding to Mobile #1. In this example, that communication mode is voice. The presentation/probability processor 128 may then determine an order of probability based on the records 202 of the communication options 204 having a voice communication mode. In one implementation, the presentation/probability processor 128 processes the timestamps 210 of the voice-mode communication options, excluding the communication option that just failed, and determines the order of probability to be the communication option having the most recent timestamp to the communication option having the latest timestamp. In the example of FIG. 2, the order of probability would be: Landline #2, Mobile #2, Landline #1.

In another configuration, the presentation/probability processor 128 also determines an alternative communication mode that is different than the determined communication mode. For example, if the determined communication mode is voice mode, then the alternative communication mode would be data mode. After determining an alternative communication mode, the presentation/probability processor 128 determines an additional order of probability based on the times of last successful communication between the user device and the contact via the communication options associated with the alternative communication mode. The presentation/probability processor 128 includes the additional order of probability in the overall order of probability.

Continuing with the above example based on FIG. 2, the presentation/probability processor 128 may determine the alternative communication mode to be data mode. The presentation/probability processor 128 may then determine an order of probability based on the records 202 of the communication options 204 having a data communication mode. In one implementation, the presentation/probability processor 128 processes the timestamps 210 of the data-mode communication options together with the timestamps of the voice-mode communication options, excluding the communication option that just failed, and determines the order of probability to be the communication option having the most recent timestamp to the communication option having the latest timestamp. In the example of FIG. 2, and considering all possible communication options, other than the option that failed, the order of probability would be: e-mail address #1, Instant messaging, Social media #1, Landline #2, VOIP, Mobile #2, Social media #2, Landline #1, and e-mail address #2.

In an aspect, the contacts processor 112 may determine if a data communication option is active or inactive, and create an overall order of probability based on this information. For example, the presentation/probability processor 128 may give a higher probability of successful communication to active data communication options and a lower probability of successful communication to inactive data communication options. Accordingly, the presentation/probability processor 128 may determine a first order of probability for the communication options that are active, and a second order of probability for the communication options that are inactive. The presentation/probability processor 128 may then prioritize the first order of probability over the second order of probability in the overall order of probability.

Continuing again with the above example based on FIG. 2, as part of determining an overall order of probability that includes data mode communication options, the contacts processor 112 may determine which of the data mode communication options are active and which are inactive. For example, the contacts processor 112 may determine that instant messaging is active, meaning that the contact is currently on line in the instant messaging communication option. In this case, the instant messaging communication option would be placed ahead of all other data-mode communication options in the overall order of probability. In another configuration, the instant messaging communication option may be placed ahead of all other communication options, both voice and data, in the overall order of probability. If the contacts processor 112 determines that more than one data-mode communication option is active, then the order of these active options may be based on the timestamps associated with the options.

In order to determine whether a data communication option is active or inactive, the contacts processor 112 may provide an API interface 132 which can be used by installed applications, e.g., gtalk app, what's up app, skype app, facebook app, outlook app, etc.). Applications (gtalk app, skype app, facebook app, etc) can register with the various read, write APIS/indications provided by the contacts processor 112. More specifically the contacts processor 112 may provide a getStatus indication and InformStatus API. Applications can register to the InformStatus API and getStatus indication provided by the contact processor 112.

When the contacts processor 112 needs the status of particular contact information, the request is broadcasted to all the applications which are registered with the getStatus indication of the contact processor and whichever application has the status of the contact information, returns the following information using the InformStatus api.
 1. Latest available status (Status, Time span of status)
 2. Last time of contact
 3. Suggested action (Name of action)
 4. Function to be invoked by contacts app to perform the suggested action As an example, contact information like suman.yelati@gmail.com, when broadcasted by getStatus indication to various applications, may cause each application to return the information that is available with them using InformStatus api. The status may be like the following:
 App1 (Gtalk):
  1. Status: Online, Time Span: n/a
  2. Last time of contact: 7/15/2014, 3:50 PM
  3. Suggested action: Ping
  4. Function to be invoked: gtalkPing (suman.yelati@gmail.com)
 App2 (Facebook):
  1. Status: Offline, Time: 10 mins
  2. Last time of contact: 7/16/2014, 8:00 AM
  3. Suggested action: Send Message
  4. Function to be invoked: facebookSendMessage (suman.yelati@gmail.com)

Figure 3:
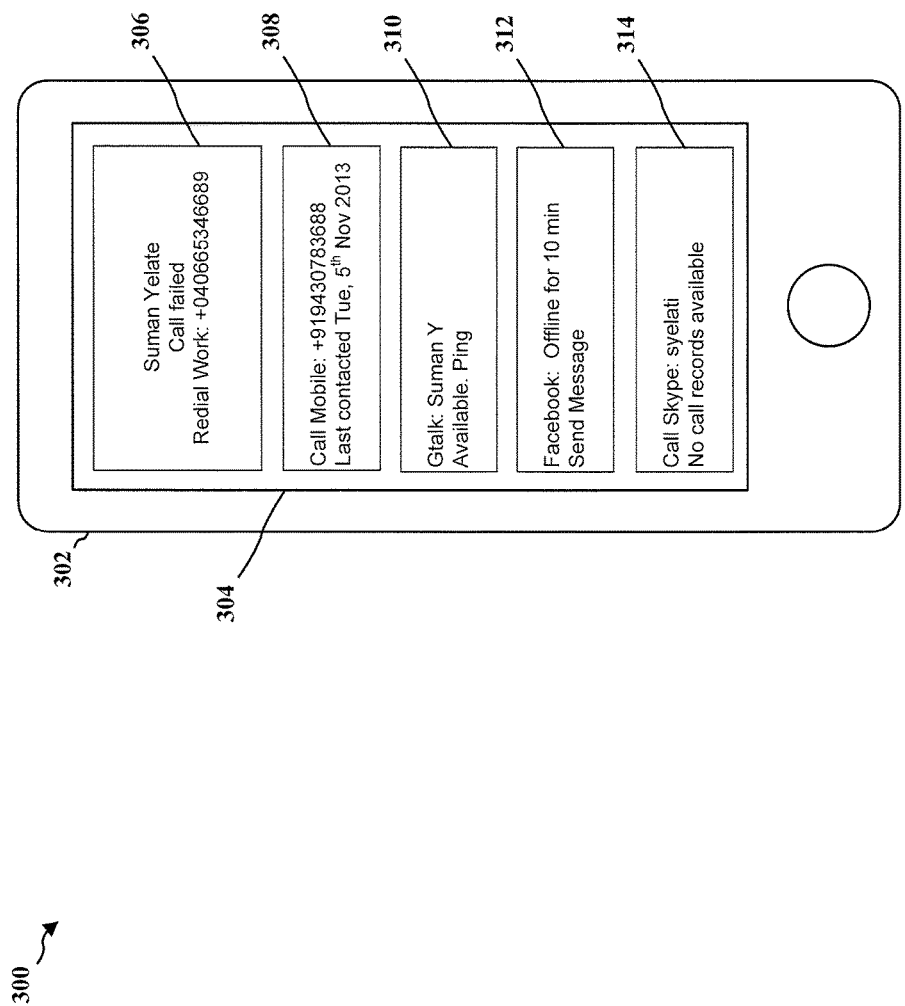
FIG. 3 is an illustration of a handheld user device with a display showing an example presentation of communication options provided in response to a failed communication attempt.

FIG. 3 is an illustration 30 of a handheld user device 302 with a display 304 showing an example presentation of communication options in response to a failed communication attempt. The communication options are presented as regions of the display. The top region 306 presents the communication option that resulted in the failed communication attempt. In this example, the failed communication option corresponds to a telephone number.

The next region 308 presents a first alternative communication option having the highest probability of resulting in a successful communication. The communication option is an option within the same communication mode, i.e., voice, as the failed communication option and corresponds to a mobile telephone number. The time of last successful communication by the first alternative communication option may be included in the presentation.

The next region 310 presents a second alternative communication option having the next highest probability of resulting in a successful communication. The second alternative communication option is in a communication mode, i.e., data, different from the communication mode of the failed communication option and corresponds to instant messaging. In this example, the user device 302 has determined that the second alternative communication option is active, meaning the contact is currently online. Accordingly, the online status (available) is included in the presentation, along with an option to ping the contact via instant messaging.

The next region 312 presents a third alternative communication option having the next highest probability of resulting in a successful communication. The communication option corresponds to social media. The online status (offline) is included in the presentation, along with an option to send a message to the contact via instant messaging.

The next region 314 presents a communication option having the next highest probability of resulting in a successful communication. The communication option corresponds to VOIP. An indication of activity or lack thereof (no call records available) is included in the presentation, along with an identification for the contact.

Figure 4:
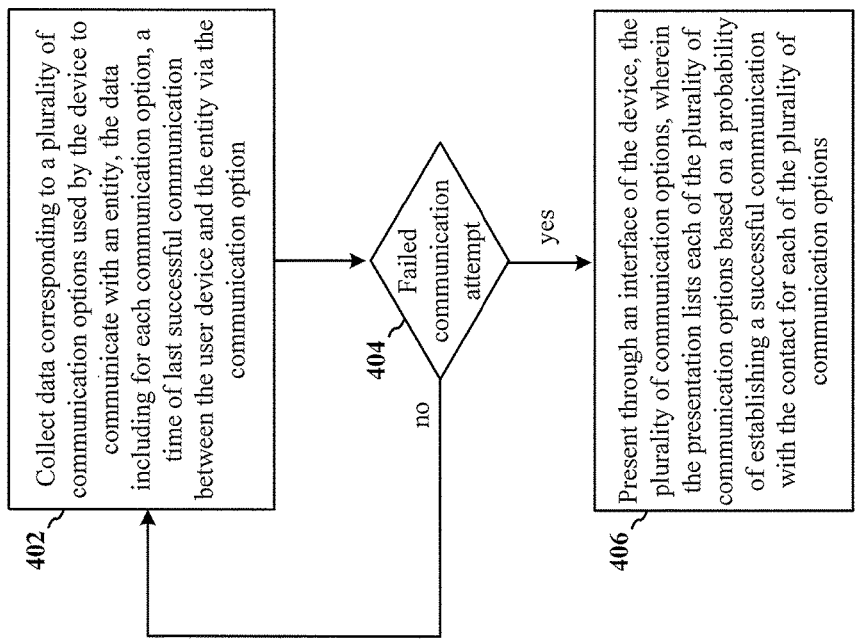
FIG. 4 is a flow chart of a method of presenting communication options for a user device.

FIG. 4 is a flow chart of a method of presenting communication options for a user device. At step 402, the user device collects data corresponding to a plurality of communication options used by the device to communicate with a contact. With reference to FIG. 2, the data may include, for each communication option, a time of last successful communication between the user device and the contact via the communication option. Collecting data includes storing in memory, for each of the plurality of communication options, a timestamp corresponding to the time of last successful communication via the communication option. The plurality of communication options may be categorized into a plurality of communication modes including at least one of a voice mode and data mode.

At step 404, the user device determines if a communication attempt failed. For example, the contacts processor 112 of the user device may receive information from a communication processor 110 of the device that indicates whether the communication attempt was successful or unsuccessful. If the communication attempt was successful, the process returns to step 402, where the user device continues to collect data.

If the communication attempt failed, the process proceeds to step 406, where the user device presents in a presentation through an interface of the device, the plurality of communication options associated with the contact. The presentation may be in an overall order of probability of the user establishing a successful communication with the contact through the communication option. To this end, the presentation may list each of the plurality of communication options based on a probability of establishing a successful communication with the contact for each of the plurality of communication options. The presentation may present the communication options in order from highest to lowest probability, or may present the options in no particular order and instead identify the option having the highest probability by a visual indication, e.g., bold or flashing text.

The user device may present the plurality of communication options by determining the communication mode of the communication option that resulted in the failed attempt to communicate, and then determining the overall order of probability for the communication options based on the times of last successful communication between the user device and the contact via the communication options associated with the determined communication mode. More specifically, the user device may determine the communication mode of the communication option that resulted in the failed attempt to communicate; determine a first set of communication options from the plurality of communication options, where each communication option in the first set has a communication mode corresponding to the communication mode of the communication option that resulted in the failed attempt to communicate; and determine the probability of establishing a successful communication with the contact for each of the plurality of communication options in the first set based on the time of last successful communication between the device and the contact via the communication option; and list the first set of communication options in the presentation. In this case, the communication options presented may be limited to communication options within the same communication mode as the communication option that failed.

The user device may also present the plurality of communication options by determining an alternative communication mode from the plurality of communication modes, that is different than the determined communication mode, then determining an additional order of probability based on the times of last successful communication between the user device and the contact via the communication options associated with the alternative communication mode, and then including the additional order of probability in the overall order of probability. More specifically, the user device may determine a second set of communication options from the plurality of communication modes, where each communication option in the second set having a communication mode not corresponding to the communication mode of the communication option that resulted in the failed attempt to communicate; determine the probability of establishing a successful communication with the contact for each of the plurality of communication options in the second set based on the time of last successful communication between the device and the contact via the communication option; and list the second set of communication options in the presentation, together with the first set of communication option. In this case, the communication options presented may include communication options outside of the communication mode of the failed communication option. The communication options presented may include both communication options within the same communication mode as the communication option that failed and communication options outside of the communication mode of the failed communication option.

In the case of data communication options, as part of presenting communication options, the user device may determine if the data communication option is active or inactive. The user device may then determine a first order of probability for the communication options that are active, determine a second order of probability for the communication options that are inactive, and prioritize the first order of probability over the second order of probability in the overall order of probability. As part of presenting communication options, the user device may also include in the presentation, the time of last successful communication between the user device and the contact via the communication option.

Figure 5:
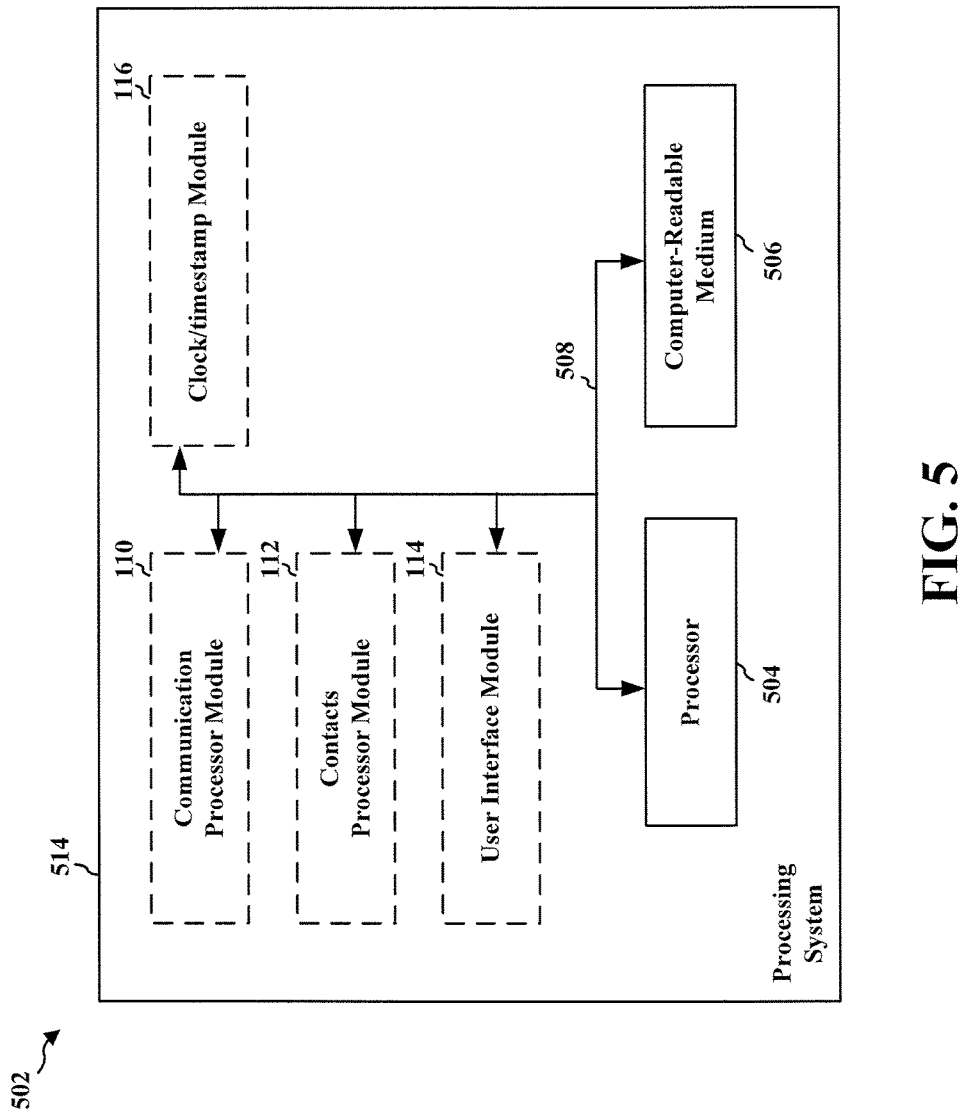
FIG. 5 is a diagram illustrating a hardware implementation for a user device employing a processing system to implement the method of FIG. 4.

FIG. 5 is a diagram illustrating an example of a hardware implementation for a user device 102 employing a processing system 514. The processing system 514 may be implemented with a bus architecture, represented generally by the bus 508. The bus 508 may include any number of interconnecting buses and bridges depending on the specific application of the processing system 514 and the overall design constraints. The bus 508 links together various circuits including one or more processors and/or hardware modules, represented by the processor 504, the modules 110, 112, 114 and 116 and the computer-readable medium 506. The bus 508 may also link various other circuits such as timing sources, peripherals, voltage regulators, and power management circuits, which are well known in the art, and therefore, will not be described any further.

The processing system 514 includes a processor 504 coupled to a computer-readable medium 506. The processor 504 is responsible for general processing, including the execution of software stored on the computer-readable medium 506. The software, when executed by the processor 504, causes the processing system 514 to perform the various functions described supra for any particular apparatus. The computer-readable medium 506 may also be used for storing data that is manipulated by the processor 504 when executing software. The processing system further includes at least one of the modules 110, 112, 114 and 116. The modules may be software modules running in the processor 504, resident/stored in the computer readable medium 506, one or more hardware modules coupled to the processor 504, or some combination thereof.

In one configuration, the user device 102, 502 includes means for collecting data corresponding to a plurality of communication options used by the device to communicate with a contact, the data including for each communication option, a time of last successful communication between the user device and the contact via the communication option, and means for presenting, in response to a failed attempt to communicate with the contact, the plurality of communication options in a presentation through an interface of the device, wherein the presentation lists each of the plurality of communication options based on a probability of establishing a successful communication with the contact for each of the plurality of communication options. The aforementioned means may be one or more of the aforementioned modules of the apparatus 102 and/or the processing system 514 of the apparatus 502 configured to perform the functions recited by the aforementioned means.

The apparatus 102, 502 may include additional modules that perform each of the steps of the algorithm in the aforementioned flow chart of FIG. 3. As such, each step in the aforementioned flow chart of FIG. 3 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of presenting communication options for a user device, comprising:
   collecting data corresponding to a plurality of communication options used by the user device to communicate with a contact, the data including for each communication option, a time of last successful communication between the user device and the contact via the communication option; and
   presenting, in response to a failed communication by the user device with the contact, the plurality of communication options in a presentation through an interface of the user device, wherein the presentation lists each of the plurality of communication options based on a probability of establishing a successful communication with the contact for each of the plurality of communication options.

2. The method of claim 1, wherein collecting data comprises storing in memory, for each of the plurality of communication options, a timestamp corresponding to the time of last successful communication via the communication option.

3. The method of claim 1, wherein each of the plurality of communication options is categorized into one of a plurality of communication modes comprising at least one of a voice mode or data mode.

4. The method of claim 3, wherein the voice mode comprises one or more communication options corresponding to telephone numbers.

5. The method of claim 3, wherein the data mode comprises one or more communication options corresponding to one or more of a voice over internet protocol (VOIP) application identification, an e-mail address, an instant messaging identification, and a social media account identification.

6. The method of claim 3, wherein the data further includes for each communication option, a communication mode, and presenting the plurality of communication options comprises:
   determining the communication mode of the communication option that resulted in the failed communication;

determining a first set of communication options from the plurality of communication options, each communication option in the first set having a communication mode corresponding to the communication mode of the communication option that resulted in the failed communication; and determining the probability of establishing a successful communication with the contact for each of the plurality of communication options in the first set based on the time of last successful communication between the user device and the contact via the communication option;

wherein the presentation lists the first set of communication options.

7. The method of claim 6, wherein presenting the plurality of communication options further comprises:

determining a second set of communication options from the plurality of communication modes, each communication option in the second set having a communication mode not corresponding to the communication mode of the communication option that resulted in the failed communication; and determining the probability of establishing a successful communication with the contact for each of the plurality of communication options in the second set based on the time of last successful communication between the user device and the contact via the communication option;

wherein the presentation further lists the second set of communication options.

8. The method of claim 6, wherein, when the communication mode of the communication option that resulted in the failed communication is a data mode, determining the probability of establishing a successful communication with the contact for each of the plurality of communication options in the first set is further based on whether the communication option is active or inactive.

9. The method of claim 8, further comprising prioritizing, within the presentation, communication options that are active over communication options that are inactive.

10. The method of claim 1, further comprising, for one or more of the plurality of communication options, including the time of last successful communication between the user device and the contact via the communication option, in the presentation.

11. A user device, comprising:

a memory; and at least one processor coupled to the memory and configured to:

collect data corresponding to a plurality of communication options used by the user device to communicate with a contact, the data including for each communication option, a time of last successful communication between the user device and the contact via the communication option; and present, in response to a failed communication by the user device with the contact, the plurality of communication options in a presentation through an interface of the user device, wherein the presentation lists each of the plurality of communication options based on a probability of establishing a successful communication with the contact for each of the plurality of communication options.

12. The user device of claim 11, wherein the at least one processor collects data by being further configured to store in memory, for each of the plurality of communication options, a timestamp corresponding to the time of last successful communication via the communication option.

13. The user device of claim 11, wherein each of the plurality of communication options is categorized into one of a plurality of communication modes comprising at least one of a voice mode or data mode.

14. The user device of claim 13, wherein the voice mode comprises one or more communication options corresponding to telephone numbers.

15. The user device of claim 13, wherein the data mode comprises one or more communication options corresponding to one or more of a voice over internet protocol (VOIP) application identification, an e-mail address, an instant messaging identification, and a social media account identification.

16. The user device of claim 13, wherein the data further includes for each communication option, a communication mode, and the at least one processor presents the plurality of communication options by being configured to:

determine the communication mode of the communication option that resulted in the failed communication;

determine a first set of communication options from the plurality of communication options, each communication option in the first set having a communication mode corresponding to the communication mode of the communication option that resulted in the failed communication; and determine the probability of establishing a successful communication with the contact for each of the plurality of communication options in the first set based on the time of last successful communication between the user device and the contact via the communication option;

wherein the presentation lists the first set of communication options.

17. The user device of claim 16, wherein the at least one processor presents the plurality of communication options by being further configured to:

determine a second set of communication options from the plurality of communication modes, each communication option in the second set having a communication mode not corresponding to the communication mode of the communication option that resulted in the failed communication; and determine the probability of establishing a successful communication with the contact for each of the plurality of communication options in the second set based on the time of last successful communication between the user device and the contact via the communication option;

wherein the presentation further lists the second set of communication options.

18. The user device of claim 16, wherein, when the communication mode of the communication option that resulted in the failed communication is a data mode, the at least one processor determines the probability of establishing a successful communication with the contact for each of the plurality of communication options in the first set further based on whether the communication option is active or inactive.

19. The user device of claim 18, wherein the at least one processor is configured to prioritize, within the presentation, communication options that are active over communication options that are inactive.

20. The user device of claim 1, further comprising, for one or more of the plurality of communication options, including the time of last successful communication between the user device and the contact via the communication option, in the presentation.

21. A user device, comprising:
   means for collecting data corresponding to a plurality of communication options used by the user device to communicate with a contact, the data including for each communication option, a time of last successful communication between the user device and the contact via the communication option; and
   means for presenting, in response to a failed communication by the user device with the contact, the plurality of communication options in a presentation through an interface of the user device, wherein the presentation lists each of the plurality of communication options based on a probability of establishing a successful communication with the contact for each of the plurality of communication options.

22. The user device of claim 21, wherein the means for collecting data comprises storing in memory, for each of the plurality of communication options, a timestamp corresponding to the time of last successful communication via the communication option.

23. The user device of claim 21, wherein the plurality of communication options are categorized into a plurality of communication modes comprising at least one of a voice mode and data mode.

24. The user device of claim 23, wherein the data mode comprises one or more communication options corresponding to one or more of a voice over internet protocol (VOIP) application identification, an e-mail address, an instant messaging identification, and a social media account identification.

25. The user device of claim 23, wherein the data further includes for each communication option, a communication mode, and the means for presenting the plurality of communication options is configured to:
   determine the communication mode of the communication option that resulted in the failed communication;
   determine a first set of communication options from the plurality of communication options, each communication option in the first set having a communication mode corresponding to the communication mode of the communication option that resulted in the failed communication; and
   determine the probability of establishing a successful communication with the contact for each of the plurality of communication options in the first set based on the time of last successful communication between the user device and the contact via the communication option;
   wherein the presentation lists the first set of communication options.

26. The user device of claim 25, wherein the means for presenting the plurality of communication options is further configured to:
   determine a second set of communication options from the plurality of communication modes, each communication option in the second set having a communication mode not corresponding to the communication mode of the communication option that resulted in the failed communication; and
   determine the probability of establishing a successful communication with the contact for each of the plurality of communication options in the second set based on the time of last successful communication between the user device and the contact via the communication option;
   wherein the presentation further lists the second set of communication options.

27. The user device of claim 23, wherein when the communication mode of the communication option that resulted in the failed communication is a data mode, the probability of establishing a successful communication with the contact for each of the plurality of communication options in the first set is further based on whether the communication option is active or inactive.

28. The user device of claim 27, the means for presenting the plurality of communication options is further configured to prioritize, within the presentation, communication options that are active over communication options that are inactive.

29. The user device of claim 21, wherein, means for presenting the plurality of communication options is further configured to, for one or more of the plurality of communication options, include the time of last successful communication between the user device and the contact via the communication option in the presentation.

30. A non-transitory computer-readable medium storing computer executable code, comprising code to:
   collect data corresponding to a plurality of communication options used by device user device to communicate with a contact, the data including for each communication option, a time of last successful communication between the user device and the contact via the communication option; and
   present, in response to a failed communication by the user device with the contact, the plurality of communication options in a presentation through an interface of the user device, wherein the presentation lists each of the plurality of communication options based on a probability of establishing a successful communication with the contact for each of the plurality of communication options.

* * * * *